July 9, 1968   S. LEUSCHKE   3,391,627
SHUTTER BRAKE
Filed April 15, 1966

INVENTOR
SIEGFRIED LEUSCHKE
BY Young + Thompson
ATTORNEYS

United States Patent Office 3,391,627
Patented July 9, 1968

3,391,627
SHUTTER BRAKE
Siegfried Leuschke, Dresden, Germany, assignor to VEB Pentacon Dresden Kamera- und Kinowerke, Dresden, Germany
Filed Apr. 15, 1966, Ser. No. 542,872
5 Claims. (Cl. 95—57)

The present invention relates to cameras and to apparatus for braking the two curtains of curtain-type shutters at the end of their running off.

The braking of the curtains at the end of their running off path is necessary in order to avoid jolting of the camera, damage to the curtains and gear parts and rebounding of the curtains.

Brake apparatus are known which consist of resilient stops. While these stops prevent a hard impact, they favour the rebound phenomenon however. Moreover various kinds of friction brakes are known which entirely or at least partially avoid rebounding. Most of these brake arrangements have the disadvantage however that as a result of the brake force acting upon the curtain-winding shaft, a moment peak occurs at the beginning of the winding of the curtains, so that an irregular winding moment is produced.

A brake apparatus is known which seeks to avoid this disadvantage with the aid of a looped-spring free-wheel coupling. Apart from the expense necessary for such an arrangement, a considerable force moment must be applied also for the disengagement of such a looped-spring coupling.

Therefore the present invention is based upon the problem of providing an apparatus for braking the two curtains of curtain-type shutters at the end of their running-off movement, which arrangement renders possible a practically constant winding moment, with low constructional expense.

According to the invention this problem is solved due to the fact that the brake apparatus consists of a domed leaf spring fast with the housing and a pivotably mounted brake shoe resting with slight force engagement thereon, the brake surfaces formed by the leaf spring and the brake shoe including an acute angle, the aperture of which lies in the running-off path of a part which is positively moved in the running off of the curtains, which part comes to a halt after passing through the brake arrangement, while in the transference of the curtains into the cocked position the brake shoe is pivoted by the said part out of its running-off path.

Due to the fact that the brake shoe needs to be pressed under only slight force engagement against the leaf spring, because the essential brake force becomes effective only when the part which is moved positively in the running off of the shutter enters between the brake surfaces and the brake shoe is then entrained, the requisite force moment for pivoting out the brake shoe in the winding of the curtains is minimal, so that a practically constant winding moment is produced.

An especially expedient form of embodiment of the invention provides that the brake shoe is formed as a bent-off arm of a lever pivotably mounted on a plate, and extends into a recess provided on the plate and comprises a stop surface co-operating with the plate.

The force moment necessary for pivoting out the brake shoe can further be reduced according to the invention due to the fact that the brake shoe is formed as an arc of a circle the centre point of which coincides with the pivot point of the pivotable lever carrying the brake shoe.

The part positively moved in the running off of the curtains can be formed according to a further feature of the invention by the curtain bars, and the brake arrangement is here arranged in the running-off path of the two curtains.

In order to avoid damage to the curtains and to render possible a uniform braking action over the entire width of the curtains, according to a further feature of the invention a brake arrangement is provided in each case in the space between the curtain straps and the curtains.

An example of embodiment of the invention is illustrated in the drawing.

Figure 1:
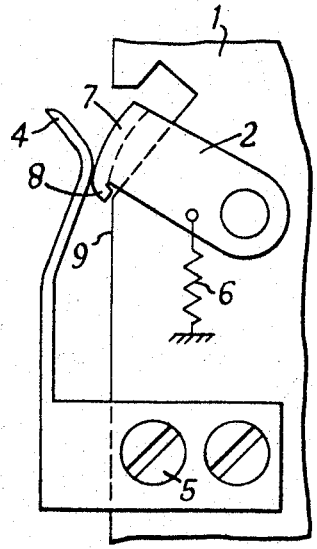
FIGURES 1–3 show the brake arrangement in plan view, in various operational conditions.

On a plate 1, a lever 2 is pivotably mounted about a bolt 3. The plate 1 further carries a domed leaf spring 4 which is secured by means of screws 5. A weak spring 6 draws the lever 2 with its angled-off arm, serving as a brake shoe 7, against the leaf spring 4. A bent-off surface 8 on the brake shoe 7 acts together with the longitudinal edge 9 of the plate 1 as stop for the lever 2.

The brake shoe 7 is rounded off and is formed by an arc of a circle the centre of which coincides with the pivot point (bolt 3) of the lever 2.

The two curtains 10 and 11 are connected in known manner with the associated curtain straps 14, 15 and 14' and 15' by means of curtain bars 12, 13 which at the same time form the slot edge.

Figure 2:
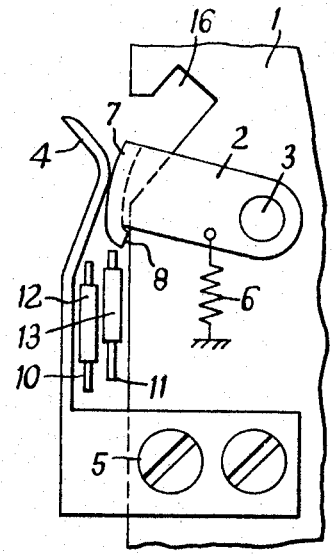

Before the two curtains 10, 11 run off, the lever 2 carrying the brake shoe 7 adopts the position as illustrated in FIGURE 1. It is drawn with slight force against the leaf spring 4 by the weak spring 6. Where the curtains run off vertically, the spring 6 can even be omitted, since the mass of the lever 2 is sufficient to constitute the requisite force engagement. After release of the shut er the two curtains 10, 11 with the curtain bars 12, 13 associated with them run successively through the brake arrangement in the predetermined sequence. Here when the curtain bars enter the acute angle formed by the surfaces of the leaf spring 4 and of the brake shoe 7, the brake shoe 7 is entrained in the runing-off direction until it comes to abut with its surface 8 on the longitudinal edge 9 of the plate 1. After running through the brake arrangement, the curtains are brought to a complete halt with the aid of a resilient stop known per se (not shown) and assume the position as illustrated in FIGURE 2.

Figure 3:
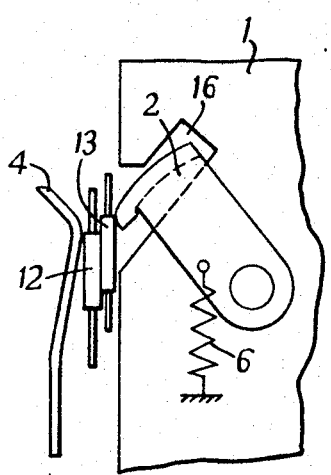
Figure 4:
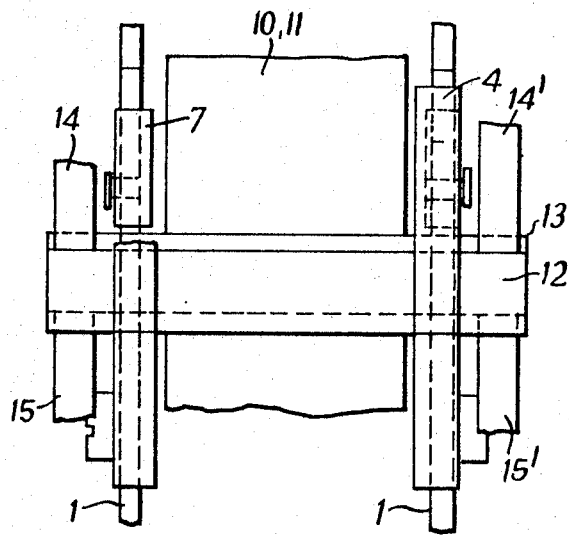
FIGURE 4 shows a lateral elevation of the brake arrangement.

In the winding of the two curtains (FIGURE 3), the lever 5 is pivoted out of the running off path by the curtain bars 12, 13 the brake shoe completely entering a recess 16 provided on the plate 1.

I claim:
1. Apparatus for braking the two curtains of curtain-type shutters at the end of their running off, wherein the brake arrangement consists of a domed leaf spring fast with the housing and of a pivotably mounted brake shoe resting under slight force engagement thereon, the brake surfaces formed by the leaf spring and the brake shoe including an acute angle, the opening of which lies in the running-off path of a part moved positively in the running-off of the curtains, which part comes to a halt after run- ning through the brake arrangement, while in the transference of the curtains into the cocked position the brake shoe is pivoted by the said part out of its running off path.

2. Apparatus according to claim 1, wherein the brake shoe is formed as a bent-off arm of a lever pivotably mounted on a plate and extends into a recess provided on the plate, and comprises a stop surface co-operating with the plate.

3. Apparatus according to claim 2, wherein the brake shoe is formed as an arc of a circle the centre of which coincides with the pivot point of the lever carrying the brake shoe.

4. Apparatus according to claim 1, wherein the part moved positively in the running-off of the curtains is formed by the curtain bars and the brake arrangement is arranged in the running-off path of the two curtains.

5. Apparatus according to claim 1, wherein a brake arrangement is arranged in each case in the space between the curtain straps and the curtains.

No references cited.

JOHN M. HORAN, *Primary Examiner.*